Sept. 26, 1950        J. F. MORSE        2,523,665

CONTROL MECHANISM FOR HYDRAULIC POWER UNITS

Filed Nov. 18, 1947        3 Sheets-Sheet 1

INVENTOR
JOHN F MORSE
BY
ATTORNEYS

Sept. 26, 1950   J. F. MORSE   2,523,665
CONTROL MECHANISM FOR HYDRAULIC POWER UNITS
Filed Nov. 18, 1947   3 Sheets-Sheet 2

INVENTOR
JOHN F MORSE
BY
ATTORNEYS

Sept. 26, 1950  J. F. MORSE  2,523,665
CONTROL MECHANISM FOR HYDRAULIC POWER UNITS
Filed Nov. 18, 1947  3 Sheets-Sheet 3
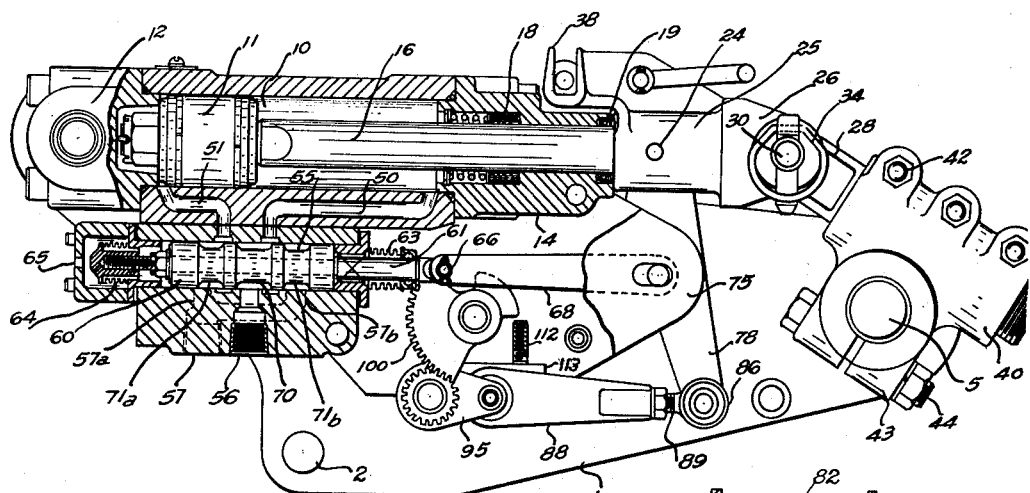
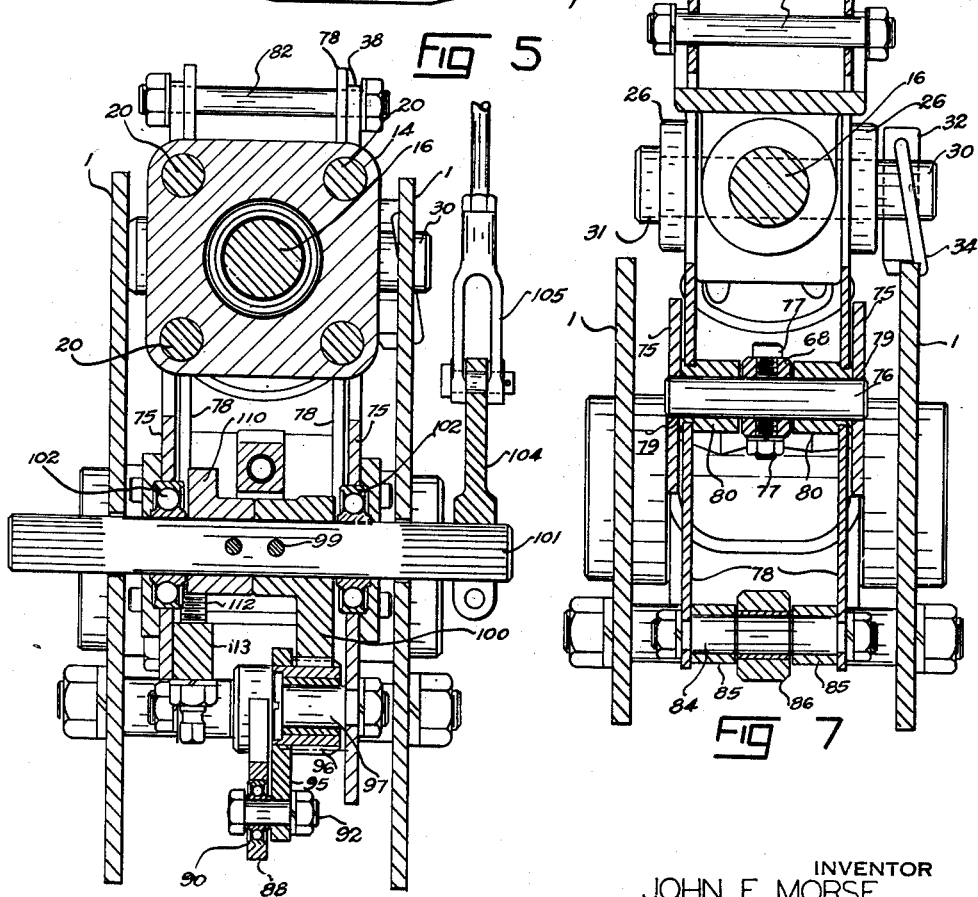
INVENTOR
JOHN F. MORSE
BY
ATTORNEYS Patented Sept. 26, 1950

2,523,665

UNITED STATES PATENT OFFICE 2,523,665

CONTROL MECHANISM FOR HYDRAULIC POWER UNITS

John F. Morse, Hudson, Ohio

Application November 18, 1947, Serial No. 786,654

15 Claims. (Cl. 121—41)

The present invention relates to improvements in control mechanisms for power units of the type in which the parts are operated by hydraulic pressure controlled by a valve or the like which admits and discharges fluid pressure from the sides of a double-acting piston. The valve is actuated by a manually operated device such as a wheel or lever and the mechanism is usually so arranged that the direction of movement of the manual device is the same as the direction in which the part or machine element is to be moved.

Various power units of the type outlined have been perfected and are generally known as "servo-type" hydraulic boosters. The pressure fluid usually employed is a light oil which is supplied under pressure to the valve by which the oil under pressure is transmitted to either side of the piston. The piston is connected directly to the parts of the machine which are to be moved.

In previous power unit assemblies the piston stops at the full limit of its stroke in either direction and the mechanism which is operated thereby is thus held at its extreme position until the piston is reversed by the reversal of the manual control. It has been found, however, in certain types of machinery or installations that, while the mechanism should be initially moved to the full extent, it is not desirable to hold the mechanism at the extreme limit of its movement but to slack or ease off the pressure exerted by the piston to a greater or less extent after the mechanism has reached either limit of its movement. If easing off of the pressure is left to the operator it will more often not be done at all and injurious results may occur due to the retention of the machine parts in their extreme position.

It is the purpose of the present invention to devise a control mechanism for power units of the type referred to in which the piston will be automatically retracted at the end of the movement of the manual control device in either direction. Thus, as the manual control device approaches the extreme of its movement, the valve is automatically reversed and the piston recedes slightly from its extreme position. This operation is accomplished without reversing the direction of the manual control, and automatically introduces into systems of this type provision for relaxation of the extreme pressures at the end of the operative stroke of the manual control device.

While the improvement in power units as outlined above is useful in connection with many types of machinery and the invention may, therefore, have a wide range of usefulness, it is particularly intended and designed for power shifting marine transmissions. Marine transmissions should have some provision for relieving the thrust at the end of each stroke so that excessive wear on the thrust bearing will be avoided.

Briefly stated, the mechanism which operates the valve in the invention as illustrated and described is so designed and arranged that during the final stage of movement of the manual control device the valve is reversed slightly after completing its full stroke in either direction. This reversal "cracks" the valve so that the pressure fluid acts in reverse for an interval just sufficient to cause the piston to recede to an extent necessary to relieve the extreme outward pressure on the piston. The operation is automatic, the operator shifts the manual control to its extreme, and without further attention on the part of the operator the transmission, or whatever machine part is operated, is moved to its extreme position and then backed off to an extent set by the mechanism. The organization is such that it does not interfere with the normal operation of the power unit.

In the drawings there is illustrated a preferred embodiment of the invention by which the advantageous results may be secured. However, the invention is not confined to the mechanism shown and described but may be embodied in other forms and may be improved upon and modified without departing from the essential features which constitute the invention. One form of "servo-type" hydraulic booster cylinders is shown, together with a specific form of valve, but the invention may be applied to other forms of boosters and valve mechanisms.

In the drawings in which the best known and preferred form of the invention is shown, Fig. 1 is a view showing the position of the mechanism when the cylinder assembly is in hydraulic balance at neutral. In this position the pressure fluid flows through the system at minimum pressure. In this figure, as well as in the companion views, certain parts have been removed and others are in section.

Fig. 5 is a view similar to Fig. 3 but showing the piston at the extreme left-hand position.

Fig. 6 is an enlarged section on the line 6—6 of Fig. 1.

Fig. 7 is an enlarged section on the line 7—7 of Fig. 1.

Figure 1:
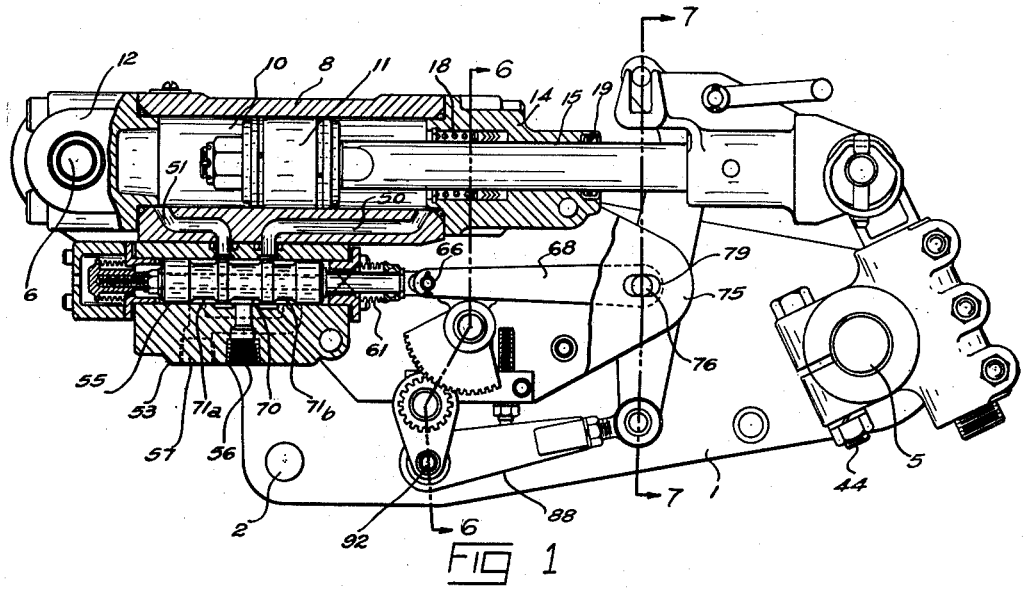

The power unit and control mechanism shown herein is carried by two parallel supporting plates 1 which are substantially triangular. At the lower left-hand corner of the plates are located holes 2 by which the unit may be attached to some stationary part, such as the base of a marine engine. The right-hand portions of the plates are received over the shaft 5 which is the shaft to be actuated by the power unit and in case the power unit is intended to operate a marine transmission this is the shaft which operates the transmission.

Extending across the plates 1 near the upper left-hand corner is the shaft 6 on which the power unit, indicated in general by the numeral 8, is rotatable.

The power cylinder as shown herein is comprised of a central chamber 10 in which the piston 11 reciprocates. The left-hand end of the cylinder is closed by a head 12 which is pivotally mounted on the shaft 6 between the plates 1. The right-hand end of the cylinder is closed by the head 14 having a central passage 15 through which the piston rod 16 reciprocates. A heavy spring-held packing 18 in the interior of the head 14 prevents the seepage of the oil around the piston rod 16 and a wiper 19 keeps dirt from entering the system. Head bolts 20 hold the cylinder assembly together.

Threaded on the outer end of the piston rod and fixed by a pin 24 is a heavy yoke 25, the rear or right hand end of which is bifurcated as at 26 to form a clevis in which is received the upper end of a lever arm 28, the parts 26 and 28 being connected by the removable pivot pin 30. This pin has a head 31 on one end, the other end being apertured to receive the locking dowel 32 carrying the swinging finger grip 34. Removal of the pin 30 permits the piston to be disconnected from the transmission shaft in case of failure of the power unit. A swinging hand grip 36 is connected to the yoke by which the power unit may be raised. On the upper side of the yoke 25 are formed two parallel vertical guideways 38 to receive a portion of the valve-actuating mechanism, as will be described.

In order to adjust the stroke of the piston so as to bring it in the proper relationship to the desired rotation of the shaft 5, the lever 28 is provided with fine threads along its major portion and this part of the lever is received in a split-threaded yoke 40 arranged to be clamped about the lever 28 by bolts 42. The yoke 40 is formed with the transverse split bearing 43 which is received over the shaft 5 and squeezed in clamping relation thereon by the bolts 44.

In the lower side of the cylinder 10 are the two inlet ports 50 and 51, which lead to the opposite ends of the piston cylinder by which the pressure fluid is admitted to or discharged from the cylinder, as the case may be. These passages are brought into proximity in the wall of the cylinder where they register with passages in the side of the valve block 53 attached to the side of the cylinder.

Interiorly of the valve block is the longitudinal valve passage 55 with which the passages 50 and 51 connect, and from the opposite side of the passage 55, a centrally located passage 56 leads to the exterior of the valve block where it is connected to the intake conduit (not shown) from the pressure supply. The outlet passage from the valve chamber is indicated at 57 and is connected by two branches 57$^a$ and 57$^b$ to points near the opposite ends of the valve passage 55.

The valve proper, which is indicated at 60, is sleeve mounted on the end of a valve rod 61, reciprocating in the valve block 53, seepage around the valve rod being prevented by bellows-like seals at either end indicated by the numerals 63 and 64. The left-hand bellows 63 is enclosed by a cap 65. The right-hand end of the valve rod is connected by pin 66 to a valve-operating link 68.

The valve proper is provided with the central recessed portion 70 which establishes communication between the inlet passage 56 and the passages 50 and 51. Recessed portions 71$^a$ and 71$^b$ in the valve proper establish communication respectively between the passage 51 and outlet passage 57$^a$ or between the passage 50 and the outlet passage 57$^b$.

Figure 2:
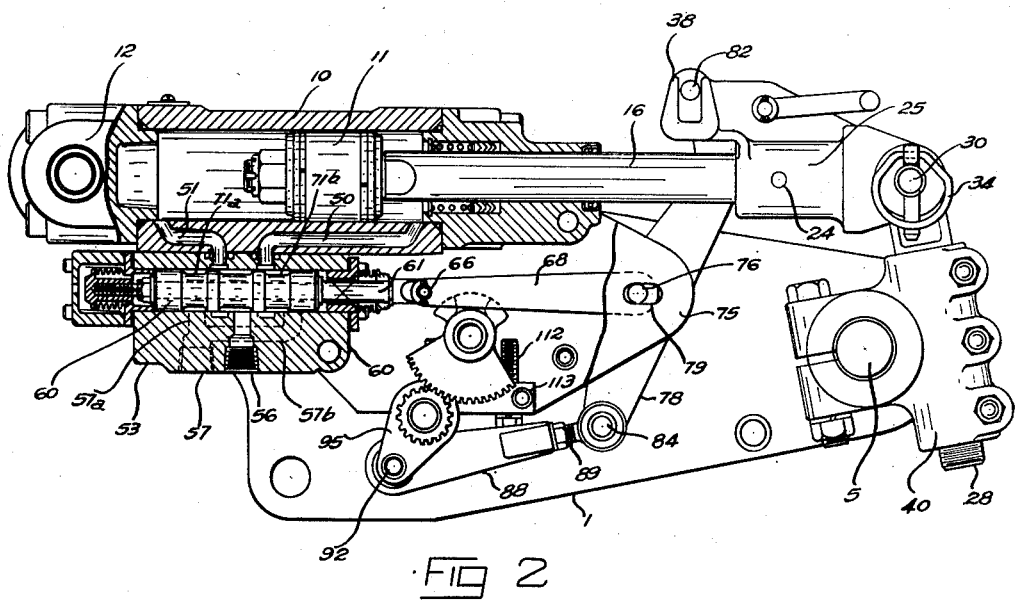
Fig. 2 shows an intermediate position of the parts when the piston is moving toward the right.

In the position of the parts shown in Fig. 1, when the device is in neutral position, the valve is at its midway position and all of the ports are in communication so that no motion is transmitted to the piston. In the position shown in Fig. 2 the passages 51 and 56 and the passages 50 and 57$^b$ are in communication so that the piston is moving to the right. In the position shown in Fig. 5 the passages 50 and 56 and the passages 51 and 57$^a$ are in communication so the piston is moving to the left.

Figure 4:
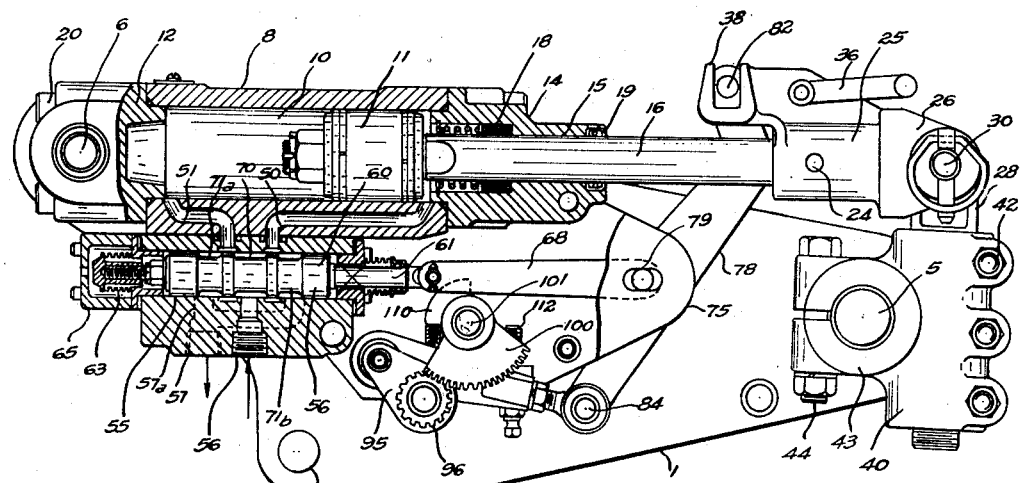
Fig. 4 shows the position of the parts at the end of movement of the manual control, showing how the valve is "cracked" and the piston has receded to relieve the thrust on the parts operated thereby.

In the position shown in Fig. 4, the valve 60 has been shifted slightly to the left "cracking" the valve so communication is reestablished between the passages 56 and 50 and between the passages 51 and 57$^a$. As shown, this is but a slight opening as the valve has moved only a short way to the left, but it is sufficient to give the requisite return movement to the piston 11 so as to relieve the extreme thrust on the shaft 5.

The mechanism which operates the valve 60 through the rod 61 and link 68 is supported in a pair of vertical side plates 75 which are attached to the valve cylinder and lie between the plates 1. The link 68 is fixed at its far end to a transverse pin 76 by set screws 77, the ends of the pin being movable in slots 79 formed in the plates 75. (See Fig. 7.) On either side of the link 68 the pin 76 is rotatable in sleeves 80 which extend inwardly in opposite directions from two parallel, vertical, swinging arms 78.

These arms 78 are bent as shown in the drawings and at their upper ends are connected by a transverse bolt 82 which pivots and moves vertically in the guides 38 heretofore described as a part of the yoke 25. Across the lower extremities of the arms 78 is a second transverse pin 84 and pivotally mounted on this pin between sleeves 85 is the head 86 of a link 88, which is adjustable by the screw-threaded connection 89 between the head and the main portion of the link.

Connected to the link 88 through the ball bearing 90 (Fig. 6) is a transverse stud 92 which is fastened in the lower end of a swinging arm 95 which is fixed at its upper end on the hub of a pinion 96. The pinion 96 is rotatably mounted on a stud 97 which is fastened in an extension on the lower side of one of the plates 75.

The pinion 96 is in mesh with a sector gear 100 that is fixed by pin 99 to a transverse operating shaft 101 rotatably mounted in ball bearings 102 in the plates 75. The shaft 101 is the manually operated shaft by which the valve is operated. It extends through the side plates 1 and is milled at either end to receive an operating lever 104 which is connected by link 105 to the remote manual control lever or wheel (not shown), but which would be located in the pilot house or at any other control station.

Figure 3:
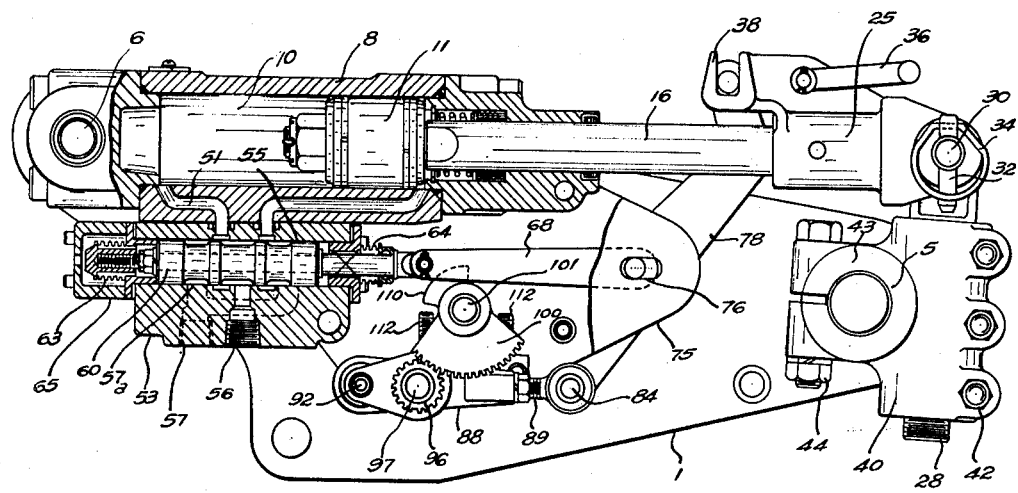
Fig. 3 shows the condition when the piston has moved to its extreme right-hand position, which is when the parts moved thereby are "home."

It will be seen that as the shaft 101 is rotated the gear 100, pinion 96 and link 88 and arm 78 will shift the valve 60 in either direction to move the piston 11 to the right or left. It will also be noted that the links 88 and 95 constitute a toggle and when the link 88 and arm 95 are at dead center with the points 84, 97 and 92 in direct line, whether in the position shown in Fig. 3 or 5, the piston is at the extreme of its movement either to the right or to the left. However, if the rotation of the shaft 101 is continued beyond this dead-center position in either direction the arm 95 will continue its movement and the arms 78 will be moved in the opposite direction and the valve will be opened. Such a condition is shown in Fig. 4 where the arm 95 has moved slightly beyond the position shown in Fig. 3. The same condition will exist, only on the opposite side, if the arm 95 is moved counter clockwise beyond its position as shown in Fig. 5.

It is desirable to move the arm 95 beyond its dead-center position to a limited extent as it is the intent to move the shaft 5 only to a degree which will reduce the pressure sufficiently to relieve the wear on the thrust bearing. For this purpose adjustable stops are provided to arrest the movement of the shaft 101 and the parts operated thereby in either direction when the parts are in a position such as illustrated in Fig. 4. The mechanism for this purpose shown in the illustrated embodiment of the invention comprises a cam 110 which is fixed on the shaft 101 by the pin 111. This cam rotates between the two stops which are set screws 112 threaded in a block 113 attached to the lower side of one of the plates 75. The stop screws are adjusted to the correct height to arrest the motion of the shaft 101 and the opening of the valve 60 at the desired point. When the valve reverses by the movement of the toggle beyond dead center, the piston will be reversed and this movement, acting through the guideways 38, causes the arms 78 to swing about the center 84 which shifts the valve to neutral. This arrests any further movement of the piston.

Reviewing briefly the operation of the device and assuming that the parts are in the neutral position shown in Fig. 1, and that the piston is to be moved to the right, the operator rotates the shaft 101 in counter-clockwise direction, which shifts the valve 60 to the left and causes the pressure fluid to enter through the passage 51, the oil behind the piston passing out through the passage 50. When the piston reaches the extreme limit of its movement the parts are in the position shown in Fig. 3, but the cam 110 has not reached the top of the stop screw 112 to the left. The operator may therefore continue the movement of the shaft which will "crack" the valve and cause the recession of the piston to the position shown in Fig. 4. The operation in the opposite direction follows the same sequence of movement. As noted above, the connection from the operator's position to the link 105 should desirably be such that the operator moves the control stick or wheel, or whatever instrumentality is employed, in the same direction as it is desired to shift the part operated by the power unit.

What is claimed is:

1. In a power unit of the type set forth, having a piston and cylinder, a driven element, connections from the piston to a driven element, a valve to admit and discharge pressure fluid to and from opposite ends of the cylinder, a rotatable control shaft, connections from the control shaft to shift the valve, said connections including a crank and a link which are in dead-center position when the piston is at an extreme of its movement, and means to arrest the movement of the shaft after the crank and link have passed the dead-center position.

2. In a power unit of the type set forth, having a piston and a cylinder, a driven shaft, connections from the piston to the shaft, a valve to control the admission of fluid pressure to the cylinder to move the piston in opposite directions, a manually operated reversible element, connections between the manually operated element and the valve operative during movement of the manually operated element in one direction to shift the valve to admit fluid pressure to the cylinder to move the piston to one extreme of its movement and then to shift the valve to reverse the movement of the piston to an extent substantially less than its full stroke.

3. In a power unit of the type set forth, having a piston and a cylinder, a driven shaft, connections from the piston to the shaft, a valve to control the admission of fluid pressure to the cylinder to move the piston in opposite directions, a manually operated element, connections between the manually operated element and the valve operative during movement of the manually operated element in one direction to shift the valve to admit fluid pressure to the cylinder to move the piston to one extreme of its movement and then to shift the valve to reverse the movement of the piston, and a stop to prevent further movement of the manually operated element after the piston has moved in reverse to a predetermined extent substantially less than its full stroke.

4. In a power unit of the type set forth, having a piston and a cylinder, a driven element, connections from the piston to said driven element, a valve to control the admission of fluid pressure to the cylinder to move the piston in opposite directions, a rotatable control shaft, a toggle operated by the control shaft, an arm connecting the piston, valve and toggle, the pivot points of the toggle being on dead center when the piston is at either extreme of its movement, and means to permit the shaft to move said toggle beyond dead center at either end of its movement to a predetermined extent to reverse the direction of the valve.

5. In a device of the character set forth, a power unit comprising a cylinder and a piston therein, a valve to admit pressure fluid to opposite ends of the cylinder, means to shift the valve, said means comprising a manually operated reversible shaft, connections between the shaft and the valve shifting means, said connections being so constructed and designed that during the latter part of one cycle of the shaft in either direction the valve is opened to an extent to cause a reduced movement of the piston in a reverse direction.

6. In a power unit of the type described, a cylinder, a piston therein, a valve to control the admission of pressure to opposite sides of the piston, an operating shaft movable in opposite directions, connections between the shaft and the valve, said connections causing the valve to move to a position to reverse the movement of the piston to a restricted extent during the last portion of the movement of the shaft in either direction.

7. In a power unit, a cylinder, a piston therein, a valve to control the admission of pressure to opposite sides of the piston, a rotatable operating shaft, stops to limit the movement of the shaft in either direction, connections between the shaft and the valve and means in said connections to reverse the valve before the movement of the shaft is arrested by one of said stops.

8. In a power unit, a cylinder, a piston therein, a valve to control the admission of pressure to opposite sides of the piston, a rotatable operating shaft, stops to limit the movement of the shaft in either direction, connections between the shaft and the valve and means in said connections to reverse the valve immediately before the movement of the shaft is arrested by one of said stops.

9. In a power unit, a cylinder, a piston therein, a shiftable valve to control the admission of pressure to opposite sides of the piston, a rotatable operating shaft, a stop to limit the movement of the shaft in one direction, operating connections between the shaft and the valve, said connections including a toggle link, the stop being so located as to arrest the movement of the shaft after the toggle link has passed dead center.

10. In a power unit, a cylinder, a piston therein, a shiftable valve to control the admission of pressure to opposite sides of the piston, a rotatable operating shaft, a stop to limit the movement of the shaft in one direction, operating connections between the shaft and the valve, said connections including a toggle link, the stop being so located as to arrest the movement of the shaft after the toggle link has passed dead center and after the valve has been shifted in reverse and said piston has thereby retreated to a point short of its extreme position.

11. In a power unit of the type described, a reversible manually operated control shaft, a cylinder, a piston in the cylinder, a valve to admit fluid pressure to opposite sides of the piston, a driven shaft connected to the piston, connections between the control shaft and the valve operative during movement of the control shaft in either direction to shift the valve during a single cycle of the control shaft, first to move the piston outwardly to its extreme position in one direction and then to reverse the valve and cause the piston to recede to a limited extent from its extreme position.

12. In a power unit of the type described, a manually operated control shaft, a cylinder, a piston in the cylinder, a valve to admit fluid pressure to opposite sides of the piston, a driven shaft connected to the piston, connections between the control shaft and the valve to shift the valve during a single cycle of the control shaft, first to move the piston outwardly to its extreme position in one direction and then to reverse the valve and cause the piston to recede from its extreme position and means to arrest the movement of the piston at a point just short of its extreme outward position.

13. In a power unit, a manually operated control shaft, a cylinder, a piston in the cylinder, a valve to admit fluid pressure to opposite sides of the piston, a driven shaft, a crank arm connected to the shaft and to the piston, a swinging arm one end of which is movable with the piston, a link connecting the swinging arm and the valve, a toggle link, one arm of the toggle being pivoted to the swinging arm, the other arm of the toggle being rotatable by the control shaft and stops to arrest the movement of the shaft after the toggle has passed dead center in either direction of its movement.

14. In a power unit comprising a cylinder, a piston therein, and a valve to admit fluid pressure to opposite sides of the piston, a reversible manually operated control lever, connections from the control lever to the valve for operating the valve, and means in said connections to cause the piston to recede to a limited extent from its extreme position during a single stroke of the control lever in either direction.

15. In a power unit comprising a cylinder, a piston therein, and a valve to admit fluid pressure to opposite sides of the piston, a reversible manually operated control lever, connections from the control lever to the valve for operating the valve, and means in said connections to cause the valve to reverse the direction of its movement and thereby reverse the movement of the piston to a limited extent during a single stroke of the control lever in either direction.

JOHN F. MORSE.

REFERENCES CITED

The following references are of record in the file of this patent:

UNITED STATES PATENTS

| Number | Name | Date |
| --- | --- | --- |
| 1,058,271 | Sundh | Apr. 8, 1913 |
| 1,339,939 | Alter | May 11, 1920 |
| 2,055,530 | Hallenbeck | Sept. 29, 1936 |
| 2,131,481 | O'Connor | Sept. 27, 1938 |
| 2,284,298 | Newton | May 26, 1942 |